United States Patent [19]
Sams

[11] 4,277,646
[45] Jul. 7, 1981

[54] APPARATUS AND METHOD FOR RESETTING DATA SETS

[75] Inventor: Terry L. Sams, Roswell, Ga.

[73] Assignee: Western Electric Company, Inc., New York, N.Y.

[21] Appl. No.: 69,467

[22] Filed: Aug. 24, 1979

[51] Int. Cl.³ .................................... H04M 11/00
[52] U.S. Cl. .............. 179/2 DP; 340/147 R
[58] Field of Search ............. 179/2 DP, 2 A, 2 CA, 179/3, 4; 178/4.1 R; 340/147 R, 147 LP, 150, 168 B; 250/214 D; 315/83

[56] References Cited

U.S. PATENT DOCUMENTS

| | | | |
|---|---|---|---|
| 2,832,914 | 4/1958 | Matkins et al. ................ | 315/83 |
| 3,427,587 | 2/1969 | Carlson et al. ................ | 178/4.1 R |
| 3,739,338 | 6/1973 | Jacobson et al. ............. | 179/2 DP |

*Primary Examiner*—Joseph A. Popek
*Attorney, Agent, or Firm*—Robert B. Kennedy

[57] ABSTRACT

A method and apparatus is disclosed for resetting a data set having a lamp for indicating the completion of a communication between a telephone and a computer or data terminal. The apparatus includes an integrated circuit and associated discrete electronic components that provide photodetection and multivibrator circuits. Signals from the photodetection and multivibrator circuits are transmitted through a logic gate to the data terminal ready lead of the data set so as to reset the data set whenever the lamp is energized.

2 Claims, 2 Drawing Figures

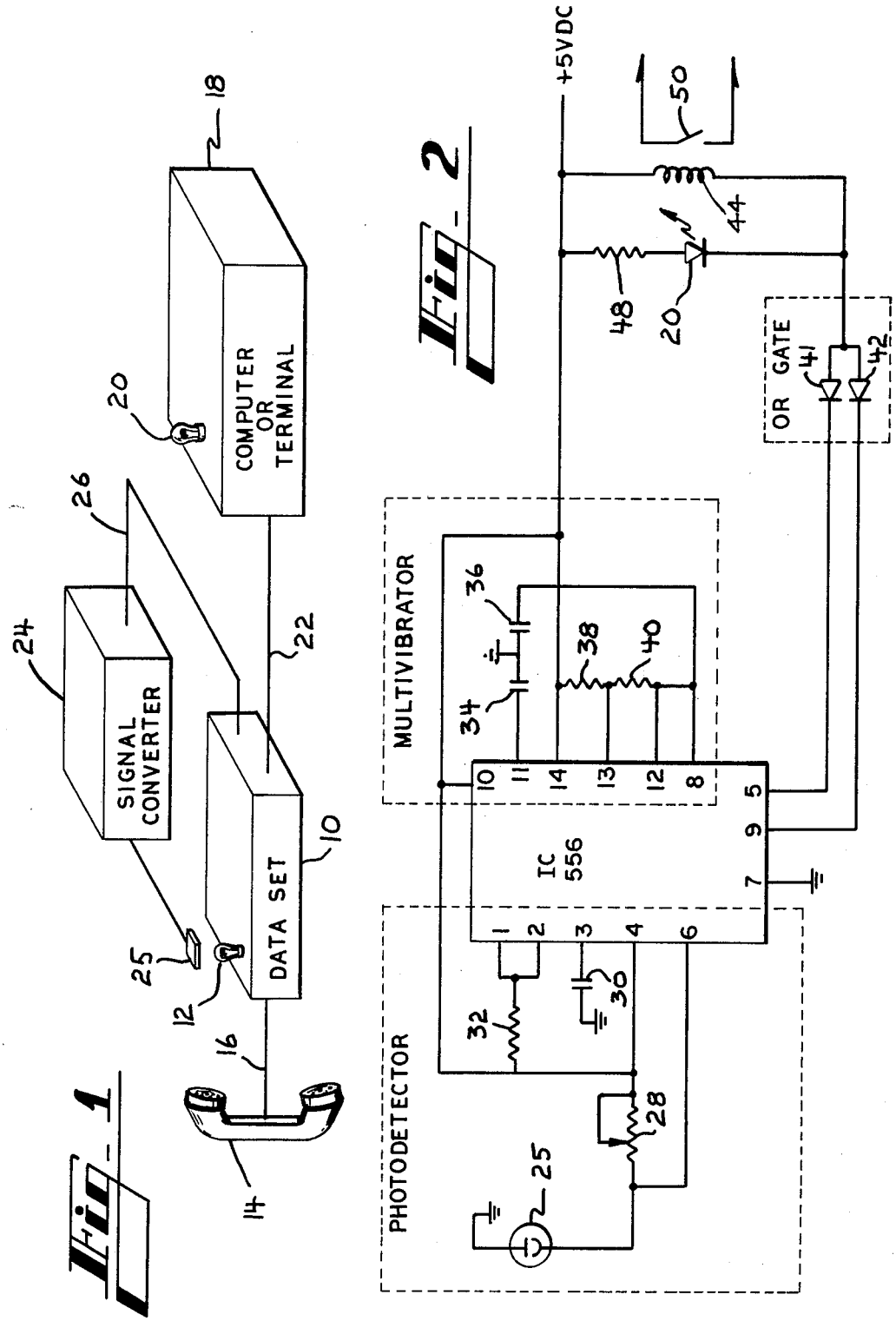

APPARATUS AND METHOD FOR RESETTING DATA SETS

TECHNICAL FIELD

This invention relates to apparatuses and methods for resetting data sets.

BACKGROUND OF THE INVENTION

Systems in which telephones are placed in communication with computers or data terminals typically employ a component known as a data set. Data sets perform such transmitting functions as converting voice or analogue signals transmitted to and from a telephone into digital signals which are transmitted to and from a computer or data terminal. The data set also performs such supervisory functions as generating a busy signal when the computer or terminal is unavailable, and answering the telephone when the computer or terminal is available. The more sophisticated data sets also have memory means for storing and forwarding data.

Once a communication has been completed by a computer or data terminal connected with a data set and telephone, the data set must be made to recognize such completion in order to drop the telephone line and thereby free the data set for service with other telephones. For this reason the data sets are normally provided with an interconnect terminal known as a data terminal ready or DTR lead by which an oscillatory signal may be received from a computer or data terminal resetting the data set upon completion of a communication. Many data terminals, however, and indeed even some computers, do not possess a DTR reset capability. Systems using these data terminals must therefore be provided with other means for indicating the completion of a communicative transaction if they are to be used at all. This means has been in the form of a supervisory lamp mounted on the data set which is energizable by the telephone or computer status. Its illumination signals an attendant that the data set needs to be reset or is out of service.

It would, of course, be desirable to automate such data sets to eliminate the need for an operator. Though the data sets themselves could be redesigned to provide this capability, this redesign would be difficult and costly to perform on existing units. Furthermore, the provision of such an additional function through redesign would be unnecessary where the data set is used with a computer or terminal that does possess a reset function. It would therefore be desirable to device an auxillary unit or apparatus which could be coupled with the data set without having to modify existing units themselves. It is to this task to which the present invention is primarily directed.

SUMMARY OF THE INVENTION

In one form of the invention a method is provided for resetting a data set coupling a telephone with a computer or data terminal of the type having light signaling means for signaling the completion of a communication and reset terminal means for receiving a data set reset signal upon completion of the communication. The reset method comprises the steps of generating an oscillatory electrical signal, monitoring the data set light signaling means, and applying the oscillatory electrical signal to the data set reset terminal means when the light signaling means signals the completion of a communication.

In another preferred form of the invention, apparatus is provided for resetting a data set having terminal means for coupling with a telephone and with a computer or data terminal, light signaling means for signaling completion of a communication between the telephone and the computer or data terminal, and reset terminal means for receiving a data set reset signal upon completion of a communication. The reset apparatus comprises a logic gate having two input leads and an output lead adapted to be operatively coupled with the data set reset terminal means. The apparatus further comprises means for detecting light from the data set light signaling means of an intensity in excess of a selected threshold, means for applying a logic signal to one of the logic gate input leads in response to the detection of light of an intensity in excess of the selected threshold, and means for applying an oscillatory signal to the other of the logic gate input leads.

BRIEF DESCRIPTION OF THE DRAWING

FIG. 1 is a block diagram of a system employing apparatus of the present invention which may be used in practicing a method of the invention.

FIG. 2 is a circuit diagram of the data set reset apparatus shown in block diagram form in FIG. 1.

DETAILED DESCRIPTION

Referring now in more details of the drawing, there is shown in FIG. 1 a communication system employing a data set 10 upon which a lamp 12 is mounted. A telephone 14 is placed in communication with the data set by means of a telephone line 16. The word "telephone" is herein meant to include devices other than conventional telephone sets that transduce audio or analogue signals such as view sets, Touch-Tone generators, and the like. A computer or data terminal 18, having a lamp 20 also mounted thereon, is coupled with the data set by means of another communications line 22.

As described to this point the communication system is conventional. For example, telephone 14 may be an independent handset, an adjunct to a terminal or a terminal itself. The computer or data terminal 18 may be a type 800 Burrough computer or a Teletype Model 33 data terminal. The data set 10 itself may be a Western Electric Company Type 407C. The system shown in FIG. 1 is also seen to include apparatus 24 for resetting the data set which in the drawing is labeled a signal convertor. The signal convertor has a photocell 25 positioned to receive light from lamp 12 and is coupled to the DTR terminal of the data set by a signal line 26.

With reference next to FIG. 2, the signal converter 24 is seen in detail to comprise a commercially available type 556 integrated circuit (IC) chip to which auxiliary circuitry is connected in a manner providing photodetector and astable multivibrator functions. The photodetector is seen to include the photocell 25 which is connected between trigger pin 6 of the IC and ground, and in series circuit with a rheostat 28 which is connected with reset pin 4. Control voltage pin 3 of the IC is connected to ground through a capacitor 30 while pins 1 and 2 are connected to the supply voltage through resistor 32.

The multivibrator function is provided by a capacitor 34 connected between voltage control pin 11 and ground and another capacitor 36 connected across trigger pin 8 and ground. The supply voltage or Vcc pin 14 is connected to a 5 VDC power supply and also to pins 10 and 4. A resistor 38 is connected across pins 13 and 14 while a resistor 40 is connected across pins 8, 12 and 13. Output pin 5 is connected to one input lead of a logic OR gate and to a gate diode 41 while output pin 9 of the IC is connected to the other input lead of the OR gate and to a diode 42. A relay coil 44 is connected across the output lead of the OR gate and the supply voltage pin 14 in parallel with serially joined lamp 20 and resistor 48. Coil 44 is operatively associated with a rely switch 50 which controls signals transmitted over the line 26 to the DTR terminal of the data set 10. One set of values for the discrete elements of the circuit is as follows:

Resistor 28—100K ohms
Resistor 32—100K ohms
Resistor 38—100K ohms
Resistor 40—100 K ohms
Resistor 48—1K ohms
Capacitor 30—6.8 microfarads
Capacitor 34—6.8 microfarads
Capacitor 36—6.8 microfarads Operation of the multivibrator is as follows: With voltage on Vcc pin 14 capacitor 36 is charged at a determinable RC rate by the flow of current through resistors 38 and 40 while the stabilizing capacitor 34 is charged to protect the circuit from transient voltages. This causes voltage to build upon the trigger pin 8. Once a potential somewhat less than 5 volts is reached the discharge pin 13 is grounded causing capacitor 36 to discharge through resistor 40 towards ground. Once capacitor 36 is substantially discharged the discharge pin 13 is, by internal circuitry of the chip, ungrounded and capacitor 36 starts to recharge. As a result, output pin 9 is periodically grounded and ungrounded at oscillatory rate of the multivibrator as established by the RC constant.

The just described circuitry serves to provide an oscillatory signal over line 26 to the DTR terminal of the data set but only when the lamp 12 is energized. In performing this that portion of the circuitry which forms an astable multivibrator generates and transmits an oscillatory signal to the OR gate which is passed through the gate in cyclically energizing relay coil 44 whenever the photodetector portion of the circuitry detects a threshold level of light. When less than threshold is detected a low level logic signal is transmitted to the other input lead of the OR gate which establishes a steady flow of current through the coil thereby terminating the cyclic closing and opening of switch 50.

More specifically, when light of an intensity level less than threshold impinges upon the photocell 25 the resistance of the photocell is relatively high as is the voltage on the trigger pin 6. The resetable trigger circuit provided by resistor 32, trigger pin 6, reset pin 4, resistor 28 and capacitor 30 causes the output pin 5 to be grounded through internal IC circuitry. As a result 5 volts DC continuously appears across coil 44 through diode 41. At the same time the multivibrator continuously places an oscillatory voltage on pin 9; but since pin 5 is grounded this has no effect on the voltage across the coil through diode 42. As a result relay switch 50 remains stationary with the orientation of the diodes 41 and 42 preventing any flow of current directly between pins 5 and 9.

Now should lamp 12 be energized, thereby indicating the need for resetting the data set, the threshold established by a setting of rheostat 28 is reached and the resistance of photocell 10 goes low as does the voltage on trigger pin 6. This causes the voltage on output pin 5 to go high due to the bias provided by resistor 32. As a result there would be no voltage across the relay coil 44 to pin 5 were it not for the multivibrator which also is connected through the OR gate to the coil. At this time however an oscillatory voltage is continuing to be placed on pin 9 causing pin 9 to be cyclically grounded. This in turn places an oscillating voltage across coil 44 causing switch 50 to cycle and transmit pulses to the DTR terminal of the data set over line 26 which causes the data set to reset and to drop line 16 terminating the energization of lamp 12. As a reset signal is transmitted lamp 20, on the terminal itself, also energized indicating that the reset signal is being transmitted. If desired the relay provided by coil 44 and switch 50 may be omitted, but its presence is preferred for circuit isolation purposes.

It should be understood that the just described embodiment merely illustrates principles of the invention in a preferred form. Many modifications, additions and deletions may, of course, be made thereto without departure from the spirit and scope of the invention as set forth in the following claims.

What is claimed is:

1. A method of resetting a data set coupling a telephone with a computer or with a data terminal of the type having light signaling means for signaling the completion of a communication and reset terminal means for receiving a data set reset signal upon completion of the communication, and with the reset method comprising the steps of generating an oscillatory electrical signal; monitoring the data set light signaling means; and applying the oscillatory electrical signal to the data set reset terminal means when the light signaling means signals the completion of a communication.

2. Apparatus for resetting a data set having terminal means for coupling with a telephone and with a computer or data terminal, light signaling means for signaling completion of a communication between the telephone and the computer or data terminal, and reset terminal means for receiving a data set reset signal upon completion of a communication, and with said reset apparatus comprising, in combination, a logic gate having at least two input leads and an output lead adapted to be operatively coupled with the data set reset terminal means; means for detecting light from the data set light signaling means of an intensity in excess of a selected threshold; means for applying an oscillatory electrical signal to one of said logic gate input leads; and means for applying a logic signal to the other of said logic gate input leads in response to the detection of light of an intensity in excess of said selected threshold.

* * * * *